US009418629B2

(12) United States Patent  
Calian et al.

(10) Patent No.: US 9,418,629 B2  
(45) Date of Patent: Aug. 16, 2016

(54) OPTICAL ILLUMINATION MAPPING

(71) Applicant: Disney Enterprises, Inc., Burbank, CA (US)

(72) Inventors: Dan Andrei Calian, London (GB); Kenneth John Mitchell, Earlston (GB)

(73) Assignee: Disney Enterprises, Inc., Burbank, CA (US)

( * ) Notice: Subject to any disclaimer, the term of this patent is extended or adjusted under 35 U.S.C. 154(b) by 196 days.

(21) Appl. No.: 13/841,894

(22) Filed: Mar. 15, 2013

(65) Prior Publication Data

US 2014/0267412 A1   Sep. 18, 2014

(51) Int. Cl.
| | |
|---|---|
| G09G 5/00 | (2006.01) |
| G09G 5/377 | (2006.01) |
| G06T 19/00 | (2011.01) |
| G06T 15/04 | (2011.01) |

(52) U.S. Cl.  
CPC ............... *G09G 5/377* (2013.01); *G06T 15/04* (2013.01); *G06T 19/006* (2013.01); *G06T 2215/16* (2013.01)

(58) Field of Classification Search  
CPC .................. G06T 19/006; G06T 15/50–15/87  
See application file for complete search history.

(56) References Cited

U.S. PATENT DOCUMENTS

| | | | | |
|---|---|---|---|---|
| 6,084,590 A | * | 7/2000 | Robotham et al. | 345/419 |
| 6,160,907 A | * | 12/2000 | Robotham et al. | 382/154 |
| 2008/0024523 A1 | * | 1/2008 | Tomite | G06T 15/50 |
| | | | | 345/632 |
| 2008/0074424 A1 | * | 3/2008 | Carignano | 345/473 |
| 2008/0106549 A1 | * | 5/2008 | Newhall, Jr. | G06T 15/04 |
| | | | | 345/426 |
| 2009/0109240 A1 | * | 4/2009 | Englert et al. | 345/633 |
| 2012/0092328 A1 | * | 4/2012 | Flaks et al. | 345/419 |
| 2012/0162254 A1 | * | 6/2012 | Anderson et al. | 345/633 |
| 2012/0263154 A1 | * | 10/2012 | Blanchflower et al. | 370/338 |
| 2013/0141434 A1 | * | 6/2013 | Sugden et al. | 345/426 |

* cited by examiner

*Primary Examiner* — Charles Tseng  
(74) *Attorney, Agent, or Firm* — Patterson + Sheridan, LLP

(57) ABSTRACT

Techniques for augmenting an appearance of a first object. Embodiments include capturing a visual scene for display. Here, the visual scene includes a physical object and wherein the visual scene is captured using one or more camera devices. The physical object is identified as a first predetermined object type, based on one or more object identifiers associated with the physical object. Embodiments also retrieve visual characteristics information corresponding to the first predetermined object type. A sequence of frames that includes the first object is then rendered for display, where the appearance the first object in the rendered sequence of frames is augmented based on the retrieved visual characteristics information and an appearance of the physical object in the captured visual scene.

15 Claims, 6 Drawing Sheets

OPTICAL ILLUMINATION MAPPING

BACKGROUND

1. Field of the Invention

The present invention generally relates to a human-computer interface and more specifically to techniques for recognizing and displaying predefined objects on an augmented reality device.

2. Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user or player uses the controller to send commands or other instructions to the video game system to control a video game or other simulation being played. For example, the controller may be provided with a manipulator (e.g., a joystick) and buttons operated by the user.

Many hand-held gaming devices include some form of camera device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

SUMMARY

Embodiments provide a method, non-transitory computer-readable medium and system for augmenting an appearance of a first object. The method, non-transitory computer-readable medium and system include capturing a visual scene for display. Here, the visual scene includes a physical object and wherein the visual scene is captured using one or more camera devices. Additionally, the method, non-transitory computer-readable medium and system include identifying the physical object as a first predetermined object type, based on one or more object identifiers associated with the physical object. The method, non-transitory computer-readable medium and system also include retrieving visual characteristics information corresponding to the first predetermined object type. The method, non-transitory computer-readable medium and system further include rendering a sequence of frames for display that includes the first object, where the appearance the first object in the rendered sequence of frames is augmented based on the retrieved visual characteristics information and an appearance of the physical object in the captured visual scene.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
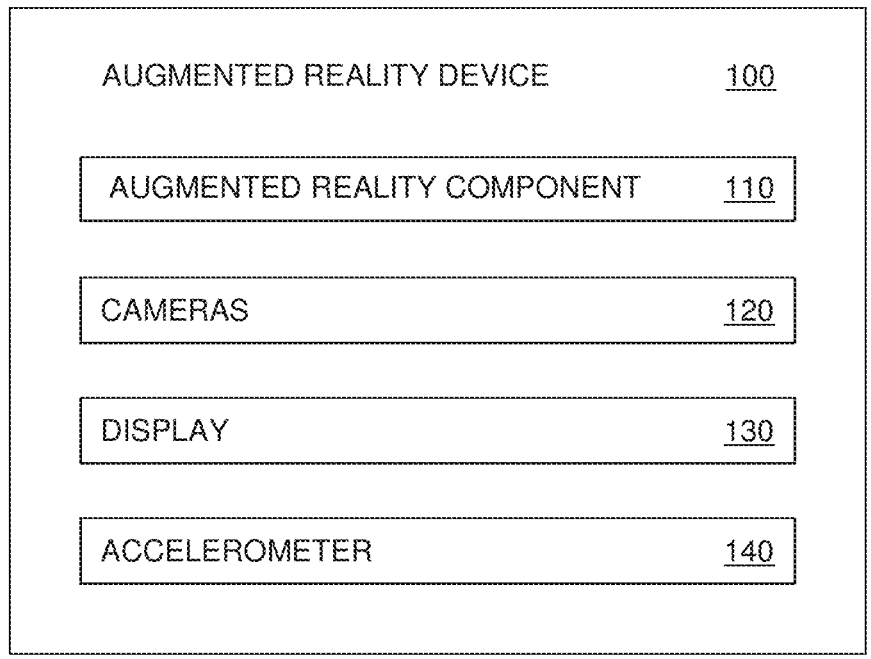
FIG. 1 is a block diagram illustrating an augmented reality device configured with an augmented reality component, according to one embodiment described herein.

Generally, embodiments of the invention provide techniques for augmenting an appearance of displayed content. In one embodiment, the augmented content is displayed on using one or more display devices on an augmented reality device. As used herein, an augmented reality device refers to any device capable of displaying a real-time view of a physical, real-world environment while altering elements within the displayed view of the environment. As such, unlike a virtual reality device which displays a view of virtual world, an augmented reality device displays a view of the real world but augments elements using computer graphics technology. Such an augmented reality device may include and/or be communicatively coupled to a camera device (or multiple camera devices) used to capture a view of the real-world environment and may further include computer software and/or hardware configured to augment elements of the captured scene. For example, an augmented reality device could capture a series of images of a coffee cup sitting on top of a table, modify the series of images so that the coffee cup appears as an animated cartoon character and display the modified series of images in real-time to a user. As such, when the user looks at the augmented reality device, the user sees an augmented view of the physical real-world environment in which the user is located.

In one embodiment, embodiments provide techniques for augmenting an appearance of a first object. For instance, logic on an augmented reality device could capture a visual scene for display. Here, the visual scene could include a physical object and could be captured using one or more camera devices. The logic could then identify the physical object as a first predetermined object type, based on one or more object identifiers associated with the physical object. For example, the logic could identify a shape and coloration of the physical object, and could use this information to identify a predefined object profile that matches the shape and coloration of the physical object. As another example, the logic could determine an approximate size of the physical object, based on the object's appearance relative to other objects within the captured frames, and could further use this size information to identify the predefined object profile.

For example, the logic (or software) could be configured to identify the object type of the physical object based on its shape. For instance, the software on the augmented reality device could analyze the visual scene to determine a plurality of edges of the physical object within the visual scene, and could use the determined plurality of edges to identify the predetermined object type of the physical object. In one embodiment, the physical object is configured with a transmitter (e.g., a RF transmitter) that transmits a signal with embedded data specifying an object type identification code. Software on the augmented reality device could receive the signal and could determine the predetermined object type of the physical object, based on the specified object type identification code.

The logic on the augmented reality device could then retrieve visual characteristics information corresponding to the first predetermined object type. For example, the logic could retrieve the predefined object profile, which could contain information describing visual characteristics of the physical object. Such visual characteristics may include, without limitation, sizing information (e.g., physical dimensions), coloration information, texture information, shape information, reflectivity information and so on. More generally, it is broadly contemplated that the object profile may contain any information relating to visual attributes of the physical object.

The logic could then render a sequence of frames for display that include the first object. Here, the logic could render the frames, such that the appearance the first object in the rendered sequence of frames is augmented based on the predefined geometric information, as well as the appearance of the physical object within the captured visual scene. The logic could then output the rendered frames for display.

For example, the logic could detect a reflection within the surface of the physical object, and could extrapolate a position, shape and appearance of the object shown in the reflection within the physical environment. That is, using information such as the reflectivity, coloration, and shape of the physical object (e.g., retrieved from the predefined object profile), the logic may in effect reverse engineer information about other objects within the environment, based on the appearance of the physical object within the captured visual scene. As an example, the logic could determine that light from a light source is reflecting off the surface of the physical object within the captured visual scene, and could reverse engineer a position, direction, color and intensity of the light source, using information retrieved from the predefined object profile.

The logic could then augmented the first object's appearance in the rendered sequence of frames, based on the physical object's appearance in the captured visual scene and further based on the retrieved predefined object profile. For example, upon identifying a light source within the physical environment (e.g., based on a reflection in the surface of the physical object), the logic could augment shading effects of the first object based on the light source. For instance, the first object's appearance could be augmented, such that light from the light source appears to reflect off one or more surfaces of the first object. Additionally, shadows could be rendered on certain surfaces of the first object, based on the determined light source. Advantageously, doing so provides a more realistic augmentation of the first object within the rendered sequence of frames.

FIG. 1 is a block diagram illustrating an augmented reality device configured with a display correction component, according to one embodiment of the present invention. As shown, the augmented reality device 100 includes an augmented reality component 110, camera devices 120, a display device 130 and an accelerometer 140. The camera devices 120 may include cameras for capturing a visual scene. As used herein, a visual scene refers to a view(s) of the real-world environment in which the device 100 is being used. For instance, a visual scene may be a series of images of a real-world environment. The camera devices 120 may also include one or more user-facing cameras. The augmented reality component 110 could use such a user-facing camera device 120 to, e.g., determine an angle at which the user is viewing the display device 130. Generally, the accelerometer 140 is a device capable of measuring the physical (or proper) acceleration of the augmented reality device 100. The augmented reality component 110 may use the accelerometer 140 to, e.g., determine when the position of the augmented reality device 100 is changing, which could indicate the user's viewing angle of the display device 130 is also changing.

Generally, the augmented reality component 110 is configured to recognize objects within a visual scene (e.g., a series of frames captured using the camera devices 120) and to adjust the depiction of the visual scene on the augmented reality device based on predefined data associated with the objects (e.g., within an object profile). For instance, the augmented reality component 110 could analyze a visual scene captured using the cameras 120 and identify an object within the visual scene that corresponds to a predefined user profile. More specifically, as the visual scene represents a three-dimensional space (i.e., the physical environment captured using the cameras 120), the augmented reality component 110 could determine an area of three-dimensional space occupied by each identified predefined object. For example, the augmented reality component 110 could be preconfigured to retrieve predefined user profiles that include geometric data that defines visual properties (e.g., size, shape, color, etc.) for particular objects, and could use the geometric data to identify instances of the predefined objects within the visual scene and the three-dimensional space each object occupies.

In one embodiment, the predefined physical object is configured with a transmitter (e.g., a radio frequency (RF) transmitter) that sends out a signal encoded with data specifying a type identifier. In such an embodiment, the augmented reality component 110 could receive the signal (e.g., using a receiver or transceiver on the augmented reality device 100) and could determine the type identifier encoded within the signal. The augmented reality component 110 could then determine the type of the object, based on the type identifier, and could retrieve the corresponding object profile.

Upon identifying the predefined object within the visual scene, the augmented reality component 110 could then retrieve a predefined object profile associated with the identified object. For example, the augmented reality component 110 could determine that the object is a reflective sphere and could retrieve a corresponding object profile. Such an object profile could specify, for instance, visual attributes of the physical object. The augmented reality component 110 could then render a series of frames depicting an augmented virtual scene, based on the retrieved object profile and an appearance of the physical object within the captured visual scene. For example, the augmented reality component 110 could extrapolate the position and visual properties of one or more lights within the physical environment, and could augment the appearance of a first object within the rendered sequence of frames, based on the position and visual properties of the lights. Advantageously, doing so enables the augmented reality component 110 to extrapolate environmental information from the physical object's appearance in the captured visual scene, thereby enhancing the appearance of the rendered sequence of frames.

For example, the augmented reality component 110 on the augmented reality device could extrapolate one or more environmental illumination characteristics of an environment in which the augmented reality device is located, based on the appearance of the predefined object within the visual scene and the object profile retrieved for the predefined object. Such environmental illumination characteristics could include, for instance, a position of a light source within an environment in which the augmented reality device is located, an angle of the light source, an indication of whether the light source is omnidirectional, a color of the light source, and an intensity of the light source and a reflectivity value of the first physical object.

Based on the environmental illumination characteristics, the augmented reality component 110 could adjust the appearance of the first object within the rendered sequence of frames. Here, the first object could comprise a virtual object (e.g., a virtual object added to the captured visual scene by the augmented reality component 110), or the first object could comprise a physical object within the captured visual scene (e.g., a physical object being augmented by the augmented reality component 110). For instance, the augmented reality component 110 could identify one or more shadows within the visual scene and could render shadows for one or more virtual characters (or objects) within the augmented reality scene based on the identified shadows. As an example, the augmented reality component 110 could determine that a toy castle has a shadow on the left side of the captured visual scene, indicating that a light source is shining on the toy castle from the right side of the captured visual scene. In such an example, the augmented reality component 110 could render shadows for virtual objects and characters in the augmented reality scene, based on a virtual light source shining from the right side of the augmented reality scene.

While the aforementioned examples refer to identifying light sources based on shadows of physical objects within the captured visual scene, these examples are without limitation and it is contemplated that numerous other techniques could be used to identify light sources within the physical environment. For instance, the augmented reality device 100 could be configured with multiple cameras positioned on multiple, different sides of the device 100, and the augmented reality component 110 could use images from these other cameras to identify light sources positioned throughout the physical environment. As another example, the rendered sequence of frames could depict a virtual pond positioned on the table next to the toy castle and could augment the appearance of the virtual pond to show reflections from one or more light sources within the environment. Moreover, the augmented reality component 110 could depict these reflections as having an effect on other virtual objects/characters or the physical toy within the augmented reality scene. For instance, the augmented reality component 110 could depict light reflected from the virtual pond shining onto the walls of the toy castle. Doing so provides a more dynamic and realistic augmented reality world that is capable of adapting to the environment in which the augmented reality device is located.

Figure 2:
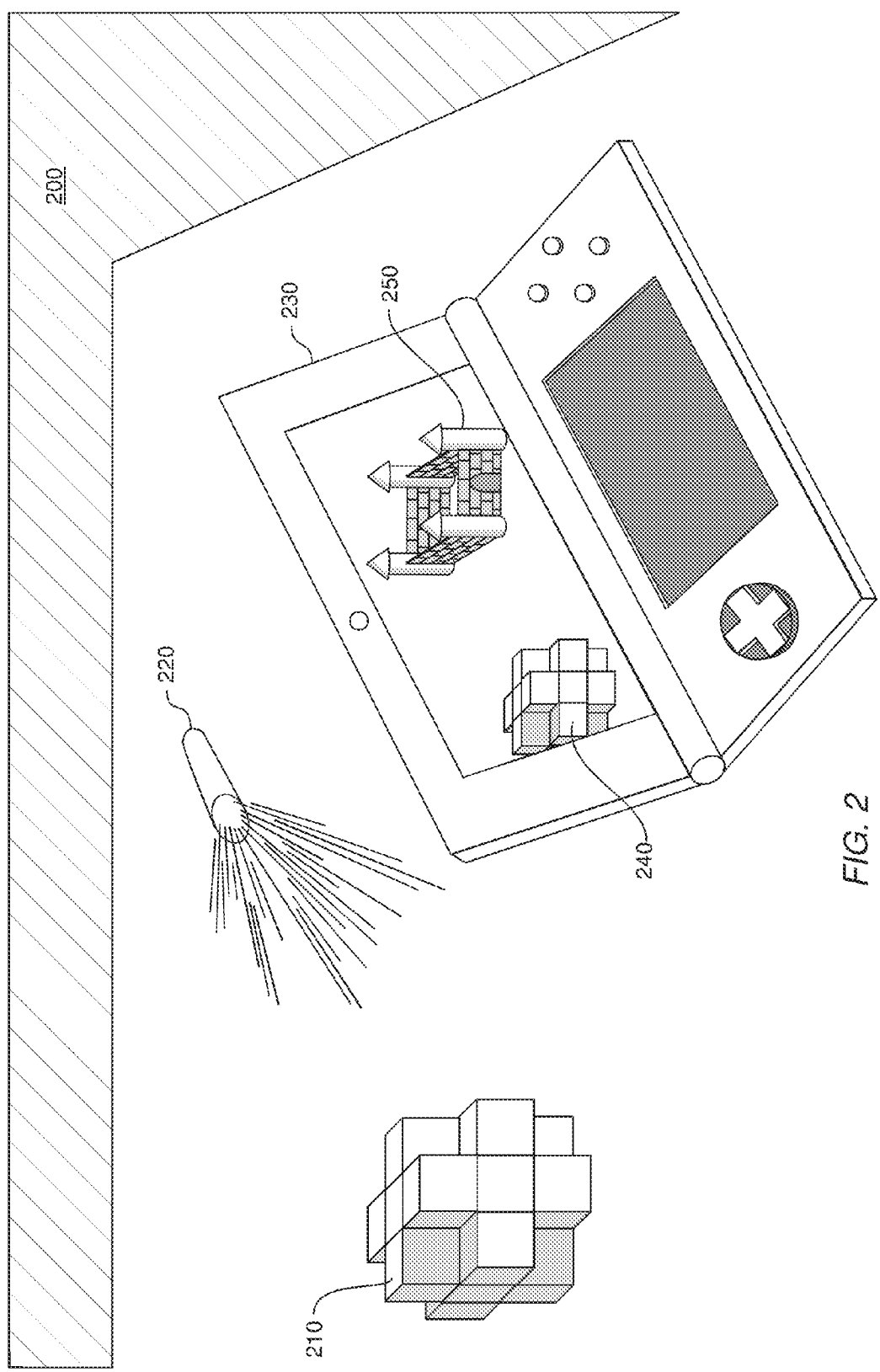
FIG. 2 illustrates an environment being viewed with an augmented reality device, according to one embodiment described herein.

FIG. 2 illustrates an environment being viewed with an augmented reality device, according to one embodiment described herein. As shown, the scene 200 includes a predefined physical object 210, a light source 220 and an augmented reality device 230. The augmented reality device 230 includes a display screen, which depicts a virtual representation 240 of the physical object 210, and a virtual object 250. Here, the augmented reality component 110 has captured one or more images of the physical object 210, and the augmented reality component 110 has identified an object profile corresponding to the object 210. The augmented reality component 110 could then have extrapolated illumination characteristics pertaining to the light source 220, based on the object profile and the object's 210 appearance in the captured images. For example, the augmented reality component 110 could determine the object's 210 natural coloration information from the object profile, and could then compare this information with the object's 210 appearance in the captured images. Thus, in the depicted example, the augmented reality component 110 could determine that the object's 210 appearance shows shadows on one side of the object 210. Based on this, the augmented reality component 110 could determine a light source exists within the physical environment and could extrapolate the light source's 220 position and characteristics, based on the shadows on the physical object 210.

In the depicted example, the augmented reality component 110 has generated a sequence of frames that include the virtual object 250. Here, the augmented reality component 110 has augmented the virtual object's 250 appearance to include shadows, to depict the light source 220 shining on the virtual object 250. Advantageously, doing so allows the augmented reality component 110 to more realistically render virtual objects such as the virtual object 250, based on the visual characteristics of the physical object 210.

Figure 3:
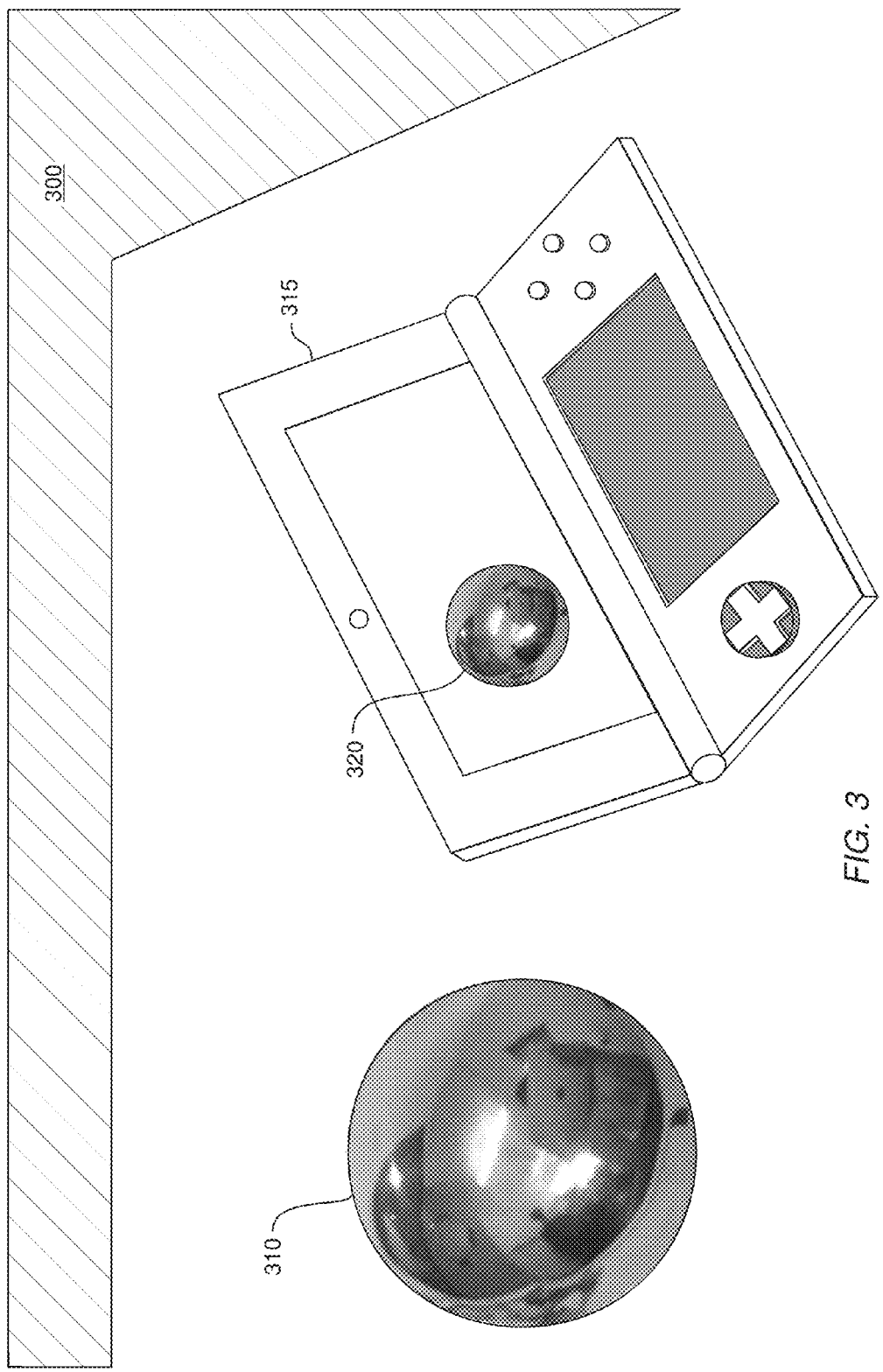
FIG. 3 illustrates an environment being viewed with an augmented reality device, according to one embodiment described herein.

In certain embodiments, it may be preferable to place a physical object having certain visual properties within the physical environment, for use in augmenting other objects within a rendered sequences of frames. An example of such an embodiment will now be discussed with respect to FIGS. 3 and 4. FIG. 3 illustrates an environment being viewed with an augmented reality device, according to one embodiment described herein. As shown, the scene 300 includes a physical object 310 and an augmented reality device 315. The augmented reality device 315 includes a display device that is currently showing a virtual representation 320 of the physical object 310.

Here, the physical object 310 represents a highly reflective sphere, on which reflections of light sources and other objects within the physical environment can be seen. The augmented reality component 110 on the augmented reality device 315 could capture one or more images of the physical object 310, and upon identifying the physical object 310, could retrieve an object profile corresponding to the object 310. The augmented reality component 110 could then retrieve visual characteristics information pertaining to the object 310 from the profile. For example, in the current example, the profile could specify that the object 310 is spherical in shape and that the surface of the object 310 is highly reflective.

Figure 4:
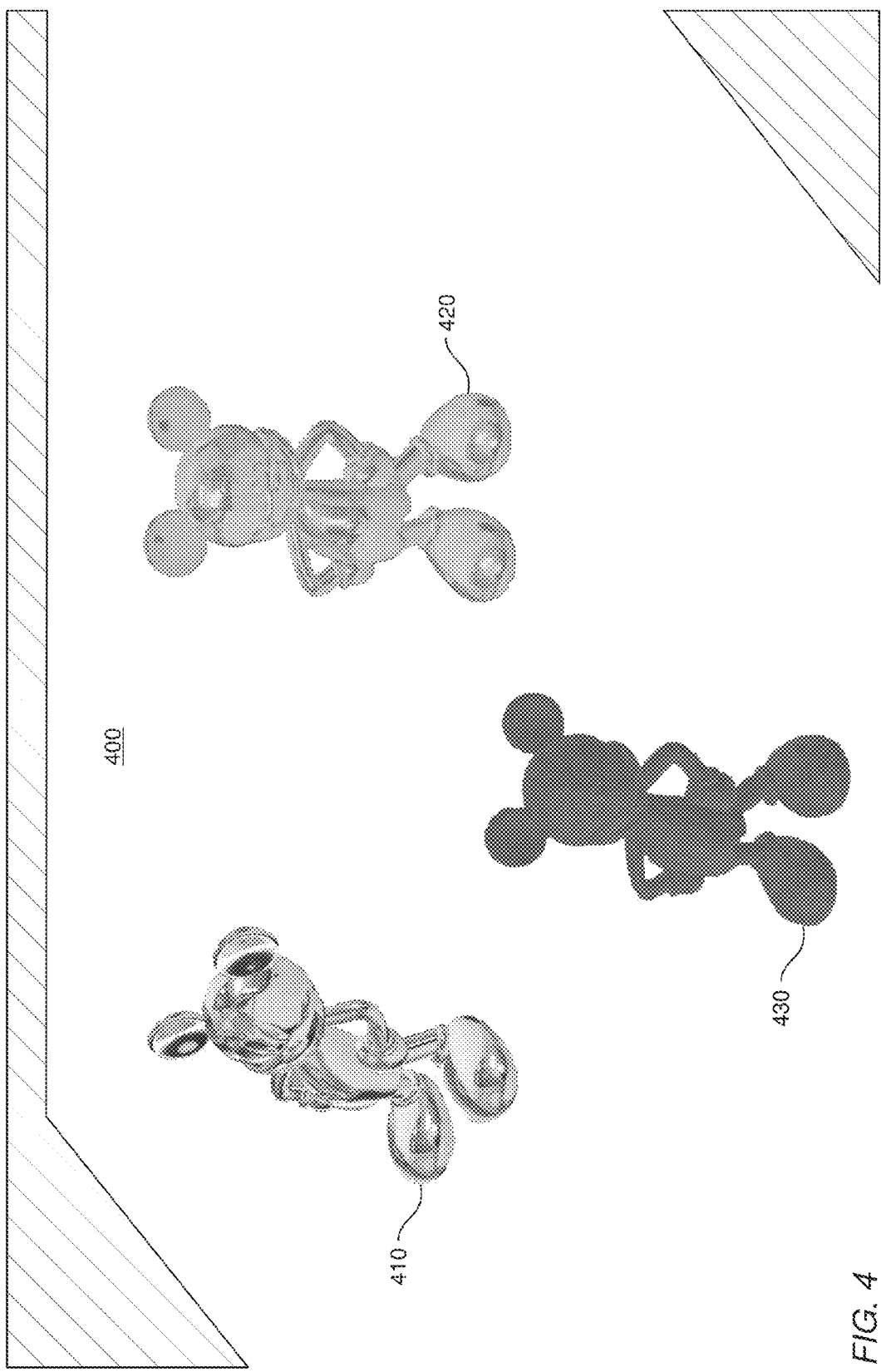
FIG. 4 illustrates a display screen of an augmented reality device, according to one embodiment described herein.

The augmented reality component 110 could then extrapolate information about the environment in which the physical object 310 is located, based on the object profile and the object's 310 appearance in the captured images. The extrapolated environmental information could then be used to augment other objects in one or more frames rendered by the augmented reality component 110. An example of this is shown in FIG. 4, which illustrates a display screen of an augmented reality device, according to one embodiment described herein. The display screen 400 depicts three virtual characters 410, 420 and 430, each with a different surface coloration and reflectivity.

Here, the augmented reality component 110 has augmented the appearance of the virtual characters 410, 420 and 430, based on the environmental information extrapolated from the physical object's 310 appearance. For instance, the virtual character 410 has a relatively high degree of reflectivity, and thus the light sources (determined based on reflections in the physical object 310) are shown as reflecting off the virtual character 410. Moreover, assuming the virtual character 410 is an animated virtual character across multiple rendered frames, the augmented reality component 110 may update the lighting effects shown on the virtual character 410, as the virtual character 410 moves from frame to frame. In addition to (or in lieu of) the position of such light sources, such reflections may be based on a determined intensity, coloration, size, shape, or other properties of the light source. Advantageously, doing so enables the augmented reality component 110 to provide more realistic augmentations of physical and virtual objects displayed on the augmented reality device (or projected using one or more projection devices), without requiring the augmented reality component 110 to be preconfigured with any environmental illumination information.

Figure 5:
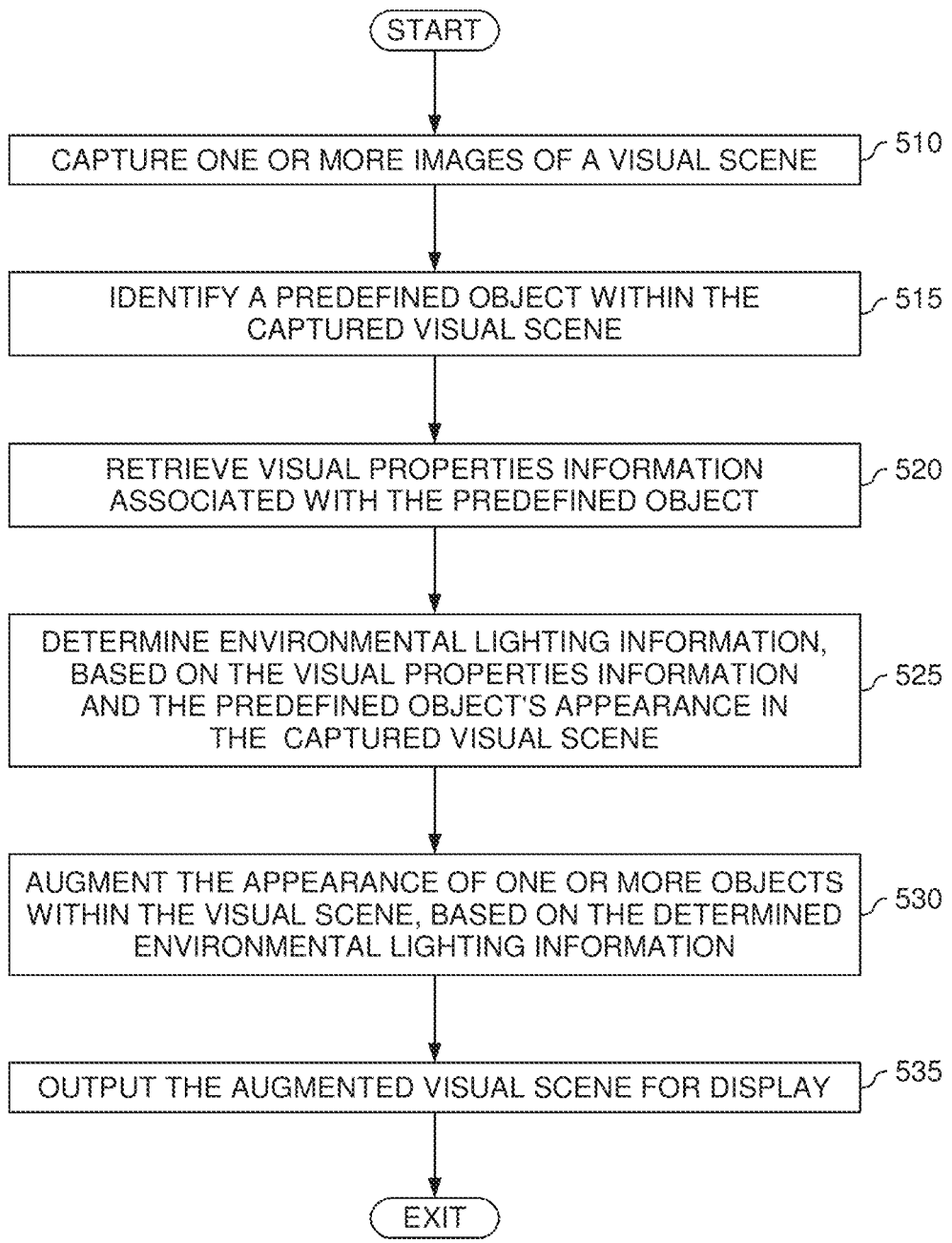
FIG. 5 is a flow diagram illustrating a method of augmenting the appearance of one or more objects within a visual scene, according to one embodiment described herein.

FIG. 5 is a flow diagram illustrating a method of augmenting the appearance of one or more objects within a visual scene, according to one embodiment described herein. The method 500 begins at block 510, where the augmented reality component 110 captures one or more images of a visual scene. For instance, the augmented reality component 110 could use one or more camera devices of an augmented reality device (e.g., the device 100) to capture the images of the visual scene. In one embodiment, the augmented reality component 110 is configured to use one or more cameras placed throughout the physical environment (e.g., a room in a house) to capture the images.

Once the images are captured, the augmented reality component 110 identifies a predefined object within the captured images of the visual scene (block 515). As discussed above, the predefined object represents any physical object that the augmented reality component 110 is configured to recognize within a captured image. Upon identifying the object within the captured images, the augmented reality component 110 retrieves visual properties information corresponding to the identified object (block 520). Generally, the visual properties information describes visual characteristics of the object. Examples of such visual characteristics include, without limitation, a size of the object, a shape of the object, coloration of the object, a measure of reflectivity for the object, a texture of the surface of the object, and so on.

The augmented reality component 110 then determines environmental lighting information, based on the visual properties information corresponding to the object and further based on the object's appearance in the captured images (block 525). For example, the augmented reality component 110 could analyze the appearance of the object within the captured scene and could identify one or more reflections on the surface of the object. The augmented reality component 110 could then extrapolate a position of one or more other objects within the environment, based on the reflections on the object's surface. For instance, the augmented reality component 110 could determine a position and coloration of a light source within the environment, based on the reflections on the object's surface.

The augmented reality component 110 could then augment the appearance of one or more objects within the visual scene, based on the determined environmental lighting information (block 530). For instance, the augmented object(s) could include physical objects within the captured scene, and/or could include virtual objects inserted into the scene by the augmented reality component 110. As an example, the augmented reality component 110 could insert an animated virtual character into a series of frames, and could augment the animated virtual character's appearance using the determined environmental lighting information, in order to improve the appearance of the animated virtual character and to create a more realistic appearance. For instance, the augmented reality component 110 could apply shading effects to the animated virtual character, based on a determination of one or more light sources within the environment (e.g., based on a determined position of the light sources, a determined direction of the light sources, a determined coloration of the light sources, a determined intensity of the light sources, etc.). As another example, assuming that the animated virtual character includes at least one highly reflective surface, the augmented reality component 110 could augment the animated virtual character's appearance to show one or more objects reflecting in the highly reflective surface (e.g., based on one or more reflections on the predefined object identified within the scene).

The augmented reality component 110 then outputs the augmented scene for display (block 535), and the method 500 ends. For example, the augmented reality component 110 could display the augmented scene using a display scene of a handheld augmented reality device. In one embodiment, the augmented reality component 110 is configured to project the augmented scene (or elements within the augmented scene, such as the animated virtual character) using one or more projection units.

Figure 6:
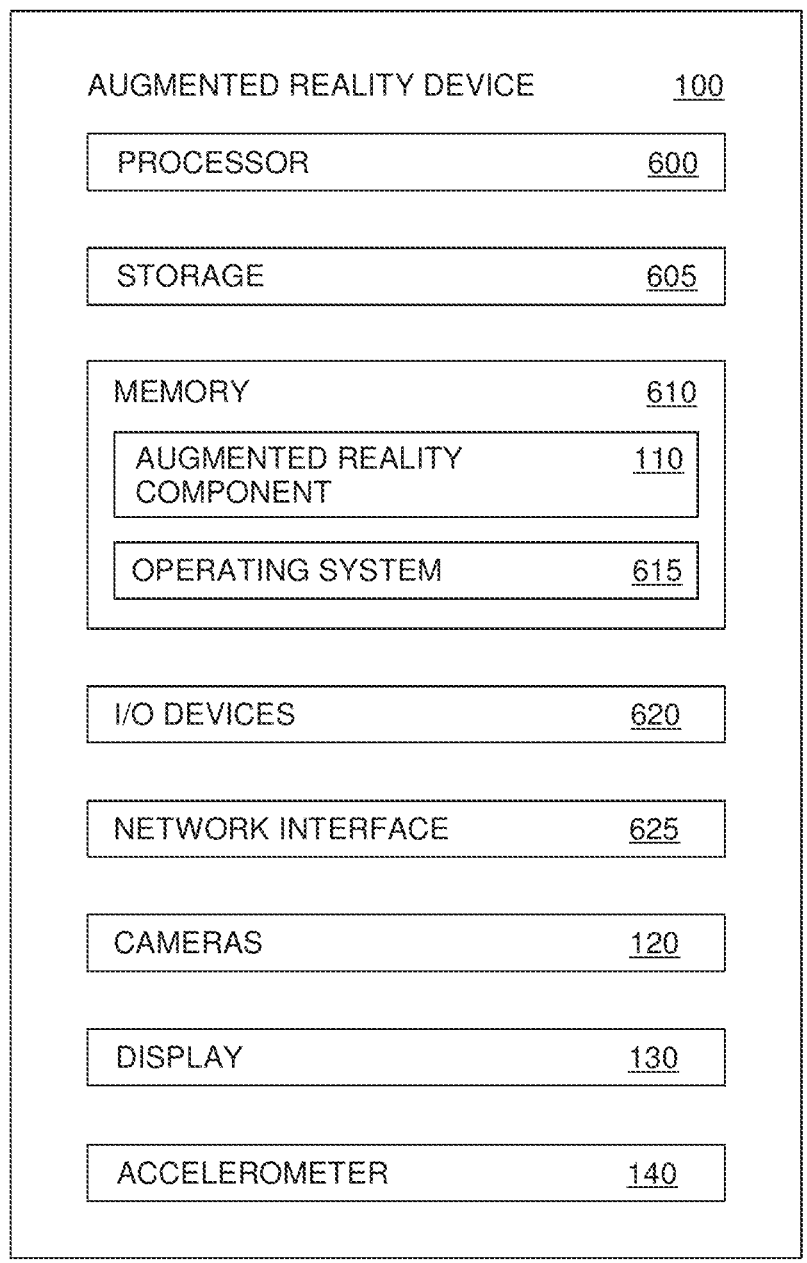
FIG. 6 is a block diagram illustrating an augmented reality device configured with an augmented reality component, according to one embodiment described herein.

FIG. 6 is a block diagram illustrating an augmented reality device configured with a surface painting component, according to one embodiment described herein. In this example, the augmented reality device 100 includes, without limitation, a processor 600, storage 605, memory 610, I/O devices 620, a network interface 625, camera devices 120, a display devices 130 and an accelerometer device 140. Generally, the processor 600 retrieves and executes programming instructions stored in the memory 610. Processor 600 is included to be representative of a single CPU, multiple CPUs, a single CPU having multiple processing cores, GPUs having multiple execution paths, and the like. The memory 610 is generally included to be representative of a random access memory. The network interface 625 enables the augmented reality device 100 to connect to a data communications network (e.g., wired Ethernet connection or an 802.11 wireless network). Further, while the depicted embodiment illustrates the components of a particular augmented reality device 100, one of ordinary skill in the art will recognize that augmented reality devices may use a variety of different hardware architectures. Specifically, in one embodiment, the augmented reality component 110 is configured for use with a projection system comprising one or more projection devices. Moreover, it is explicitly contemplated that embodiments of the invention may be implemented using any device or computer system capable of performing the functions described herein.

The memory 610 represents any memory sufficiently large to hold the necessary programs and data structures. Memory 610 could be one or a combination of memory devices, including Random Access Memory, nonvolatile or backup memory (e.g., programmable or Flash memories, read-only memories, etc.). In addition, memory 610 and storage 605 may be considered to include memory physically located elsewhere; for example, on another computer communicatively coupled to the augmented reality device 100. Illustratively, the memory 610 includes an augmented reality component 110 and an operating system 615. The operating system 615 generally controls the execution of application programs on the augmented reality device 100. Examples of operating system 615 include UNIX, a version of the Microsoft Windows® operating system, and distributions of the Linux® operating system. (Note: Linux is a trademark of Linus Torvalds in the United States and other countries.) Additional examples of operating system 615 include custom operating systems for gaming consoles, including the custom operating systems for systems such as the Nintendo DS® and Sony PSP®.

The I/O devices 620 represent a wide variety of input and output devices, including displays, keyboards, touch screens, and so on. For instance, the I/O devices 620 may include a display device used to provide a user interface. As an example, the display may provide a touch sensitive surface allowing the user to select different applications and options within an application (e.g., to select an instance of digital media content to view). Additionally, the I/O devices 620 may include a set of buttons, switches or other physical device mechanisms for controlling the augmented reality device 100. For example, the I/O devices 620 could include a set of directional buttons used to control aspects of a video game played using the augmented reality device 100.

As discussed above, the augmented reality component 110 is generally configured to augment the appearance of an object. For instance, the augmented reality component 110 could capture a visual scene for display. Here, the visual scene includes a physical object. Additionally, the visual scene may be captured using one or more camera devices. The augmented reality component 110 could also identify the physical object as a first predetermined object type, based on one or more object identifiers associated with the physical object. Moreover, the augmented reality component 110 could retrieve visual characteristics information corresponding to the first predetermined object type. The augmented reality component 110 could additionally rendering a sequence of frames for display that include the first object, where the appearance the first object in the rendered sequence of frames is augmented based on the predefined geometric information.

In the preceding, reference is made to embodiments of the invention. However, the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access environmental illumination data available in the cloud. For example, an augmented reality component 110 could execute on an augmented reality device 100 operated by a user and could collect environment illumination data pertaining to the user's current environment. In such a case, the augmented reality component 110 could transmit the collected data to a computing system in the cloud for storage. When the user again returns to same environment, the augmented reality component 110 could query the computer system in the cloud to retrieve the environmental illumination data and could then use the retrieved data to realistically model lighting effects on objects within an augmented reality scene displayed on the augmented reality device 100. Doing so allows a user to access this information from any device or computer system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of augmenting an appearance of a first virtual object, comprising:
    capturing a visual scene for display, wherein the visual scene includes a physical object and wherein the visual scene is captured using one or more camera devices;
    identifying the physical object as a object type, by analyzing the visual scene to determine a plurality of edges of the physical object within the visual scene and further based on coloration of the physical object within the visual scene;
    retrieving a predefined object profile corresponding to the first object type, wherein the predefined object profile specifies a measure of natural coloration of objects of the first object type;
    determining a plurality of attributes of a light source within an environment in which the physical object is located, based on an appearance of the physical object in the captured visual scene and the retrieved predefined object profile corresponding to the first object type, wherein the plurality of attributes include at least (i) a position of the light source within the environment and (ii) a measure of coloration of the light source, and wherein the measure of coloration of the light source is determined by comparing the appearance of the physical object within the captured visual scene to the measure of natural coloration of objects of the first object type;
    simulating lighting effects for the first virtual object based on the plurality of attributes of the light source; and
    rendering, by operation of one or more computer processors, a sequence of frames for display that includes the first virtual object, wherein the appearance of the first virtual object in the rendered sequence of frames is augmented by applying the simulated lighting effects to the first virtual object, thereby simulating an application of the light source within the environment to the first virtual object.

2. The method of claim 1, wherein the plurality of attributes of the light source include an angle of the light source, an indication of whether the light source is omnidirectional, a color of the light source, and an intensity of the light source, and
    wherein the predefined object profile corresponding to the first object type specifies a reflectivity value of objects of the first object type and a shaded reflectivity value of objects of the first object type.

3. The method of claim 1, further comprising at least one of:
    projecting the rendered sequence of frames, using one or more projection devices; and
    displaying the rendered sequence of frames on a display device of an augmented reality device.

4. The method of claim 1, further comprising:
    determining visual attributes of the physical object within the captured visual scene, based on the appearance of the physical object within the captured visual scene and the retrieved predefined object profile, wherein the visual attributes include (i) one or more shadows relating to the physical object, (ii) indirect global illumination information relating to the physical object, and (iii) one or more reflections relating to the physical object,
wherein rendering a sequence of frames for display that include the first virtual object is further based on the determined visual attributes of the physical object.

5. The method of claim 1, wherein the measure of natural coloration of objects of the first object type describes a coloration of the objects under predefined lighting conditions.

6. The method of claim 1, further comprising:
determining a measure of indirect global illumination for the environment as a whole, and separate from the plurality of attributes of the light source; and
wherein the appearance of the first virtual object in the rendered sequence of frames is further augmented based on the determined measure of indirect global illumination for the environment.

7. The method of claim 1, wherein the first virtual object includes a reflective surface, and further comprising:
determining a position and orientation of the first virtual object within a three-dimensional scene representing the environment; and
determining at least one physical object within the environment positioned in a direction of the reflective surface of the first virtual object,
wherein an appearance of the reflective surface within the rendered sequence of frames is generated based on the predefined object profile corresponding to the first object type, an appearance of the determined at least one physical object within the environment within the captured visual scene, and the plurality of attributes of the light source within the environment.

8. A non-transitory computer-readable medium containing a program that, when executed by operation of one or more processors, performs an operation for augmenting an appearance of a first virtual object, the operation comprising:
capturing a visual scene for display, wherein the visual scene includes a physical object and wherein the visual scene is captured using one or more camera devices;
identifying the physical object as a first object type, by analyzing the visual scene to determine a plurality of edges of the physical object within the visual scene and further based on coloration of the physical object within the visual scene;
retrieving a predefined object profile corresponding to the first object type, wherein the predefined object profile specifies a measure of natural coloration of objects of the first object type;
determining a plurality of attributes of a light source within an environment in which the physical object is located, based on an appearance of the physical object in the captured visual scene and the retrieved predefined object profile corresponding to the first object type, wherein the plurality of attributes include at least (i) a position of the light source within the environment and (ii) a measure of coloration of the light source, and wherein the measure of coloration of the light source is determined by comparing the appearance of the physical object within the captured visual scene to the measure of natural coloration of objects of the first object type;
simulating lighting effects for the first virtual object based on the plurality of attributes of the light source; and
rendering, by operation of one or more computer processors, a sequence of frames for display that includes the first virtual object, wherein the appearance of the first virtual object in the rendered sequence of frames is augmented by applying the simulated lighting effects to the first virtual object, thereby simulating an application of the light source within the environment to the first virtual object.

9. The non-transitory computer-readable medium of claim 8, wherein the plurality of attributes of the light source include an angle of the light source, an indication of whether the light source is omnidirectional, a color of the light source, and an intensity of the light source, and
wherein the predefined object profile corresponding to the first object type specifies a reflectivity value of objects of the first object type and a shaded reflectivity value of objects of the first object type.

10. The non-transitory computer-readable medium of claim 8, the operation further comprising at least one of:
projecting the rendered sequence of frames, using one or more projection devices; and
displaying the rendered sequence of frames on a display device of an augmented reality device.

11. The non-transitory computer-readable medium of claim 8, the operation further comprising:
determining visual attributes of the physical object within the captured visual scene, based on the appearance of the physical object within the captured visual scene and the retrieved predefined object profile, wherein the visual attributes include (i) one or more shadows relating to the physical object, (ii) indirect global illumination information relating to the physical object, and (iii) one or more reflections relating to the physical object,
wherein rendering a sequence of frames for display that include the first virtual object is further based on the determined visual attributes of the physical object.

12. A system, comprising:
a processor; and
a memory containing a program that, when executed by the processor, performs an operation for augmenting an appearance of a first virtual object, the operation comprising:
capturing a visual scene for display, wherein the visual scene includes a physical object and wherein the visual scene is captured using one or more camera devices;
identifying the physical object as a first object type, by analyzing the visual scene to determine a plurality of edges of the physical object within the visual scene and further based on coloration of the physical object within the visual scene;
retrieving a predefined object profile corresponding to the first object type, wherein the predefined object profile specifies a measure of natural coloration of objects of the first object type;
determining a plurality of attributes of a light source within an environment in which the physical object is located, based on an appearance of the physical object in the captured visual scene and the retrieved predefined object profile corresponding to the first object type, wherein the plurality of attributes include at least (i) a position of the light source within the environment and (ii) a measure of coloration of the light source, and wherein the measure of coloration of the light source is determined by comparing the appearance of the physical object within the captured visual scene to the measure of natural coloration of objects of the first object type;
simulating lighting effects for the first virtual object based on the plurality of attributes of the light source; and rendering a sequence of frames for display that includes the first virtual object, wherein the appearance of the first virtual object in the rendered sequence of frames is augmented by applying the simulated lighting effects to the first virtual object, thereby simulating an application of the light source within the environment to the first virtual object.

13. The system of claim 12, wherein the plurality of attributes of the light source include an angle of the light source, an indication of whether the light source is omnidirectional, a color of the light source, and an intensity of the light source, and
wherein the predefined object profile corresponding to the first object type specifies a reflectivity value of objects of the first object type and a shaded reflectivity value of objects of the first object type.

14. The system of claim 12, the operation further comprising at least one of:
projecting the rendered sequence of frames, using one or more projection devices; and
displaying the rendered sequence of frames on a display device of an augmented reality device.

15. The system of claim 12, the operation further comprising:
determining visual attributes of the physical object within the captured visual scene, based on the appearance of the physical object within the captured visual scene and the retrieved predefined object profile, wherein the visual attributes include (i) one or more shadows relating to the physical object, (ii) indirect global illumination information relating to the physical object, and (iii) one or more reflections relating to the physical object,
wherein rendering a sequence of frames for display that include the first virtual object is further based on the determined visual attributes of the physical object.

* * * * *